United States Patent [19]

Kijima

[11] Patent Number: 5,309,350
[45] Date of Patent: May 3, 1994

[54] PUSH-PULL INVERTER

[75] Inventor: Seiichi Kijima, Tokyo, Japan

[73] Assignee: Kijima Co., Ltd., Tokyo, Japan

[21] Appl. No.: 981

[22] Filed: Jan. 6, 1993

[51] Int. Cl.$^5$ .......................................... H02M 7/538
[52] U.S. Cl. .................................... 363/133; 315/220; 315/223; 331/114
[58] Field of Search ........................ 363/133; 331/114; 315/223, 220; H02M 7/538, 7/5383

[56] References Cited

U.S. PATENT DOCUMENTS

| 3,230,476 | 1/1966 | Massey . | |
|---|---|---|---|
| 3,383,624 | 5/1968 | Fiala | 331/113 R |
| 4,322,789 | 3/1982 | de Mere | 363/136 |
| 4,931,761 | 6/1990 | Kijima | 336/160 |

FOREIGN PATENT DOCUMENTS 3-139176  6/1991  Japan ........................... H02M 7/538

*Primary Examiner*—William H. Beha, Jr.
*Attorney, Agent, or Firm*—Spensley Horn Jubas & Lubitz

[57] ABSTRACT

Here is disclosed a push-pull inverter used to drive a cold cathode discharge tube, a hot cathode discharge tube and the like, comprising a boosting transformer having a first primary coil, a first secondary coil, a second primary coil and a second secondary coil; first and second switching elements each having a control electrode adapted for controllably interrupting primary current flowing through said first and second primary coils; a capacitor connected between the respective control electrodes of the respective switching elements; and a feedback circuit in which one end of the first secondary coil is connected to the control electrode of the first switching element and one end of the second secondary coil is connected to the control electrode of the second switching element so that load current from a load connected between the other ends of the respective first and second secondary coils flows through the capacitor.

5 Claims, 4 Drawing Sheets

PUSH-PULL INVERTER

BACKGROUND OF THE INVENTION

This invention relates to a push-pull inverter used as a driver for cold cathode discharge tube, hot cathode discharge tube or the like.

BACKGROUND ART

FIG. 4 of the attached drawings shows one typical example of the conventional push-pull inverter generally comprising a boosting transformer 12, a switching transistors 13, 14, a capacitor 15 for resonance circuit and a choke coil 16.

In this inverter, a transistor 18 serving as the power supply switch is turned ON upon closure of a power source switch 17 so that DC power is supplied from a DC source 19. Consequently, base current flows through a resistor 20 to the transistor 13 and through a resistor 21 to the transistor 14, respectively. While both the transistor 13 and the transistor 14 are thereby driven towards their turned-on states, transistor characteristics and/or circuit arrangements of the respective transistors cause any one of these two transistors to be driven more rapidly than the other and to be turned ON first.

For example, if the transistor 13 is turned ON first, current supplied from the DC power source 19 flows through a primary coil $12P_1$ of the transformer 12 via the choke coil 16, generating voltage as indicated by solid line arrows in FIG. 4 across a primary coil $12P_2$ as well as said primary coil $12P_1$, and collector voltage of the transistor 13 consequently becomes lower than collector voltage of the transistor 14.

Simultaneously voltage is generated across a tertiary coil 12F as indicated by a solid line arrow, causing a positive feedback to base of the transistor 13, and thereby collector current thereof rapidly is increased.

At this moment, inductive voltage as indicated by a solid line arrow is generated across a secondary coil 12S and initiates lighting of a fluorescent lamp 11.

Current increase flowing through the transistor 13 is suppressed as soon as it reaches a point of saturation which depends upon the base current and the amplification degree of this transistor 13 so that voltage as indicated by broken arrows is generated across the respective primary coils $12P_1$, $12P_2$ of the transistor 12 as said current increase is reduced. As a result, the transistor 13 is turned from ON to OFF whilst the transistor 14 is turned from OFF to ON.

With a consequence, voltage generated across the tertiary as indicated by a broken line arrow coil 12F causes a positive feedback to base of the transistor 14, increasing the current flowing through the primary coil $12P_2$ and generating inductive voltage across the secondary coil 12S as indicated by a broken line arrow, and thereby lighting of the fluorescent lamp 11 is maintained.

Thereafter the transistors 13, 14 are alternately turned ON and high AC voltage is generated across the secondary coil 12S.

It should be understood that the primary coils $12P_1$, $12P_2$ form together with the capacitor 15 a resonance circuit and resonance voltage of this resonance circuit causes the secondary coil 12S to provide sinusoidal wave voltage.

The inverter of FIG. 4 further comprises a source voltage stabilizing capacitor 22 and an operation stabilizing capacitor 23.

To construct the conventional inverter as has been described above, it is necessary to provide the transformer 12 with the tertiary coil 12F for feedback.

Accordingly, additional processes such as coil winding process and coil end soldering process for this tertiary coil 12F are required, which are undesirable for improvement of production efficiency.

Furthermore, provision of the above-mentioned tertiary coil 12F necessarily leads to demand for provision of terminal pins for this coil and therefore makes it difficult to obtain the compact transformer 12.

More specifically, the resultant transformer 12 includes such terminal pins as many as seven, i.e., three terminal pins for the primary coils $12P_1$, $12P_2$, two terminal pins for the secondary coil 12S and two terminal pins for the tertiary coil 12F.

Because the terminal pin of the secondary coil 12S which is provided on the high voltage side should be spaced from the remaining terminal pins, this terminal pin on the high voltage side will be fixed on one collar of a bobbin around which the coil is wound and the other terminal pins will be fixed on the opposite collar.

With a consequence, six terminal pins will be fixed on said opposite collar circumferentially at appropriate intervals and a configuration of the bobbin will necessarily become bulky. Such requirement also makes it difficult to obtain the compact transformer.

Moreover, with the inverter of prior art as has been described, it is necessary to provide the primary coils $12P_11$, $12P_2$ of the transformer 12 with the capacitor 15 for the resonance circuit.

Provision of such capacitor 15 raises a problem that the transformer 12 is readily heated as the input current from the DC power source 19 increases due to the resonance current from the resonance circuit. Such problem of heating becomes unacceptably serious as it is desired to make the transformer more and more compact.

SUMMARY OF THE INVENTION

In view of the stand of art as has been described above, it is a principal object of the invention to develop a push-pull inverter so improved that there is provided a transformer requiring no tertiary coil for feedback and a capacitor for the resonance circuit may be eliminated if desired.

The object set forth above is achieved, in accordance with the invention, by a push-pull inverter comprising a boosting transformer having a first primary coil, a first secondary coil, a second primary coil and a second secondary coil; first and second switching elements each having a control electrode adapted for controllably interrupting primary current flowing through said first and second primary coils; a capacitor connected between the respective control electrodes of said two switching elements; and a feedback circuit in which one end of said first secondary coil is connected to the control electrode of the first switching element and one end of said second secondary coil is connected to the control electrode of the second switching element so that load current from a load connected between the other ends of these first and second secondary coils flows through said capacitor.

With such inverter, the load current flows through the capacitor connected between the control electrodes of the first and second switching elements and these switching elements are alternately activated by AC current flowing through the load.

Primary current alternately flows through the first primary coil and the second primary coil and simultaneously output voltage presenting a substantially sinusoidal waveform is generated across the secondary coils as said switching elements are alternately activated.

A capacitor may be connected in parallel to the primary coils of the transformer to obtain the output voltage of which the waveform is further close to the sinusoidal waveform.

According to the invention, heating of the transformer can be minimized and the inverter of high efficiency can be provided by eliminating this capacitor.

In addition, a production efficiency of the boosting transformer is effectively improved and miniaturization of the transformer is facilitated by the invention since it is unnecessary to provide the transformer with the tertiary coil for feedback.

BRIEF DESCRIPTION OF THE DRAWINGS

Details of the invention will be readily understood from the following description of presently preferred embodiments made in reference with the attached drawings, in which.

DESCRIPTION OF THE PREFERRED EMBODIMENTS

Figure 1:
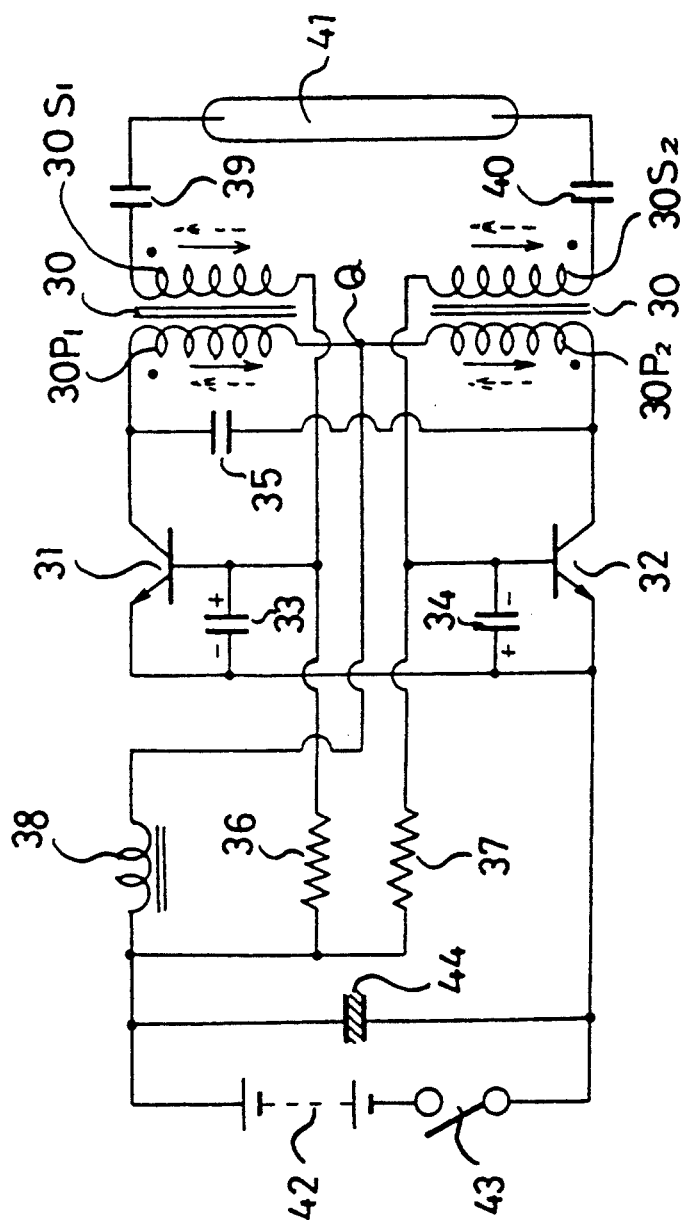
FIG. 1 is a circuit diagram showing one embodiment of the inverter constructed according to the invention.

Referring first to FIG. 1, a push-pull inverter comprises a boosting transformer 30, switching transistors 31, 32, biasing capacitors 33, 34, a capacitor 35 for resonance circuit, starting resistances 36, 37, and a choke coil 38.

The boosting transformer 30 includes a first primary coil $30P_1$, a first secondary coil $30S_1$, a second primary coil $30P_2$ and a second secondary coil $30S_2$.

DC source current is applied to a junction Q of the first primary coil $30P_1$ and the second primary coil $30P_2$. One end of the first secondary coil $30S_1$ is connected to the base of the transistor 31 while one end of the second secondary coil $30S_2$ is connected to the base of the transistor 32 so as to cause feedback of load current.

Between the other ends of the respective secondary coils $30S_1$, $30S_2$ a fluorescent lamp 41 is connected via operation stabilizing capacitors 39, 40.

The biasing capacitor 33 connected between base and emitter of the transistor 31 and the biasing capacitor 34 connected between base and emitter of the transistor 32 are charged with the load current and thereby these transistors are activated to provide switching function.

The capacitor 35 for resonance circuit may be eliminated, if desired. While this capacitor 35 is essential when a load requiring sinusoidal wave voltage is connected, such capacitor is practically unnecessary depending upon specific applications of the inverter, for example, when only lighting of the fluorescent lamp 41 is intended.

Referring also to FIG. 1, the inverter further comprises a DC power source 42, a source switch 43, and a source voltage stabilizing capacitor 44. The source switch 43 may be provided in the form of a semiconductor switch.

Figure 2:
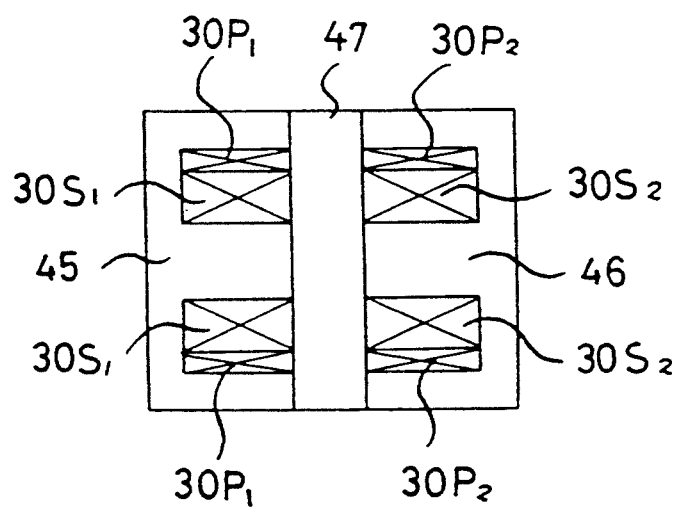
FIG. 2 is a schematic diagram showing the boosting transformer provided in said inverter.

Referring to FIG. 2 schematically showing said boosting transformer 30, this boosting transformer 30 includes two identical E-shaped ferrite cores 45, 46 and an I-shaped ferrite core 47. The E-shaped ferrite core 45 carries the first primary coil $30P_1$ and the first secondary coil $30S_1$ and the E-shaped ferrite core 46 carries the second primary coil $30P_2$ and the second secondary coil $30S_2$.

While it is not shown in details, the respective coils are wound around a bobbin which is, in turn, assembled with the E-shaped ferrite cores 45, 46 and the I-shaped ferrite core 47.

It should be understood here that the inverter of the invention may adopt, instead of said boosting transformer provided with E-I-E ferrite core, a transformer provided with the ferrite core of the other shapes such as E-E or E-I ferrite core.

Alternatively, a transformer carrying the first primary coil $30P_1$ and the first secondary coil $30S_1$ and a transformer carrying the second primary coil $30P_2$ and the second secondary coil $30S_2$ may be separately provided so that these two separate transformers may cooperate together to function as the boosting transformer 30.

With this embodiment of the inverter, upon closure of the source switch 43, source current is applied to the base of the transistor 31 via the starting resistance 36 and to the base of the transistor 32 via the starting resistance 37, respectively, turning any one of these transistors 31, 32 ON first.

Assumed that the transistor 31 has been turned ON first, the source current will flow through the choke coil 38, the primary coil $30P_1$ and the transistor 31 in this order, generating across the respective primary coils $30P_1$, $30P_2$ the voltage directed as indicated by the solid line arrows.

Correspondingly, output voltage will be generated across the respective secondary coils $30S_1$, $30S_2$ directed as indicated by the solid line arrows and this output voltage will turn the fluorescent lamp 41 on.

Upon lighting of the fluorescent lamp 41, the load current will flow through the fluorescent discharge tube 41, the capacitor 39, the secondary coil $30S_1$, the biasing capacitors 33, 34, the secondary coil $30S_2$ and the capacitor 40 in this order, charging said biasing capacitors 33, 34 with the polarity as shown.

The transistor 31 is thereby subjected to an effect of positive feedback and the collector current thereof rapidly increases.

Such increase in current flowing through the transistor 31 is suppressed as soon as the current reaches a point of saturation which depends upon the base current and the amplification degree and, therefore, voltage directed as indicated by the broken line arrows is generated across the respective primary coils $30P_1$, $30P_2$, turning the transistor 31 from ON to OFF and turning the transistor 32 from OFF to ON.

Correspondingly, output voltage directed as indicated by the broken line arrows is generated across the respective secondary coils $30S_1$. $30S_2$ and maintains lighting of the fluorescent lamp 41.

At this moment, the positive feedback causes the biasing capacitors 33, 34 to be charged with the polarity opposite to that as shown and the collector current of the transistor 32 rapidly increases.

Reaching the point of saturation, the transistor 32 is turned OFF and the transistor 31 is turned ON. Thereafter these transistors 31, 32 are alternately turned ON and thereby lighting of the fluorescent lamp 41 is maintained.

Upon opening of the source switch 43, oscillation of the inverter is stopped and the fluorescent lamp 41 is turned off.

Once the fluorescent lamp 41 as the load has been disconnected from the inverter, the transistors 31, 32 can no more provide the stabilized switching function because there is no more the effect of positive feedback.

Figure 3:
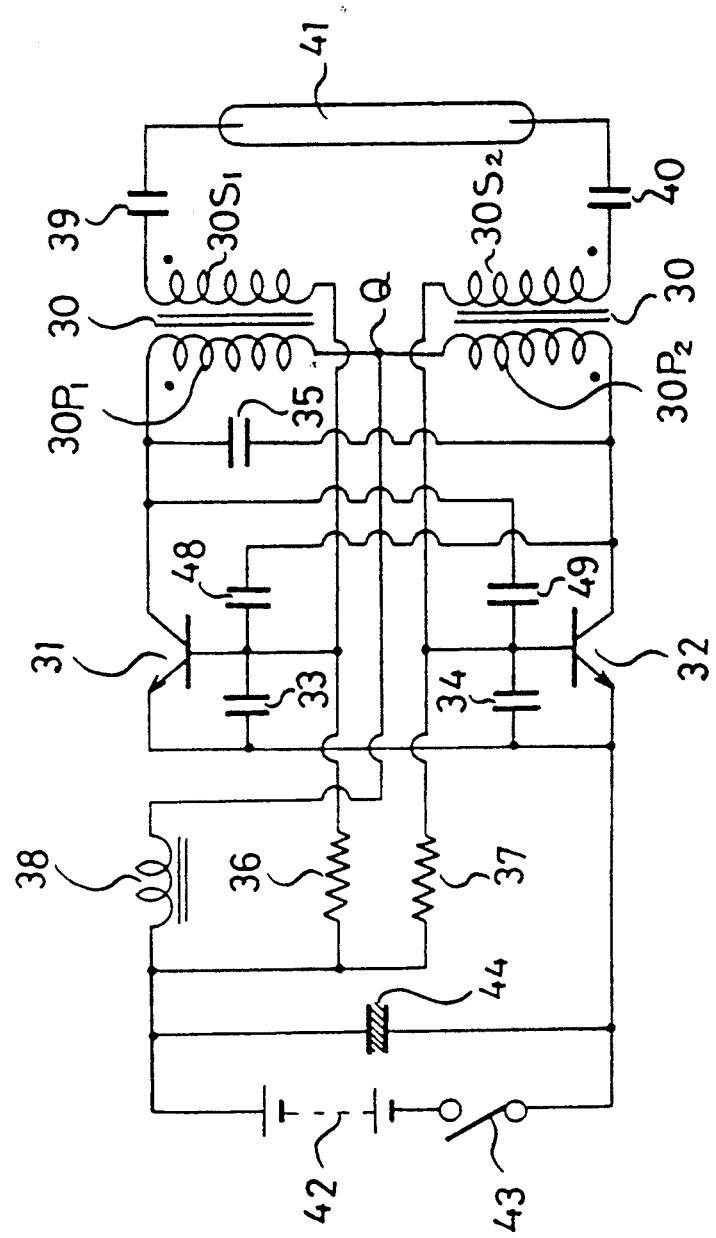
FIG. 3 is a circuit diagram showing another embodiment of the inverter constructed according to the invention.
Figure 4:
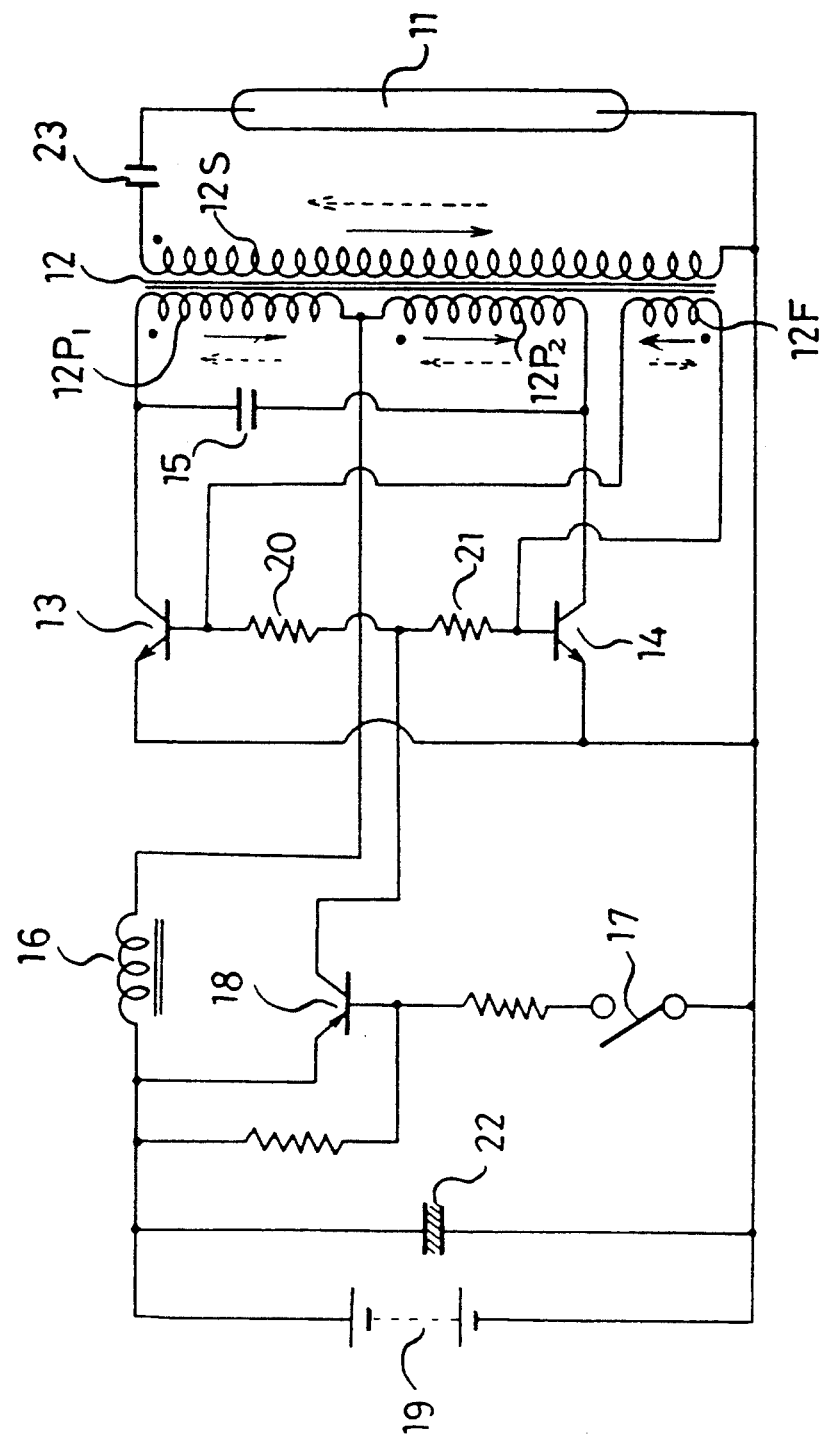
FIG. 4 is a circuit diagram showing an example of the conventional inverter.

Accordingly, it is preferred to provide an auxiliary feedback circuit comprising, as shown by FIG. 3, a capacitor 48 connected between the collector of the transistor 32 and the base of the transistor 31 and a capacitor 49 connected between the collector of the transistor 31 and the base of the transistor 32 so that voltage generated across the primary coil $30P_1$ as the transistor 31 is turned OFF may be fed back to the base of the transistor 32 and voltage generated across the primary coil $30P_2$ as the transistor 32 is turned OFF may be fed back to the base of the transistor 31.

While the invention has been described hereinabove with respect to the specific embodiments, the biasing capacitors 33, 34 may be replaced by a single capacitor connected between the bases of the respective transistors 31, 32 and/or any one of the starting resistances 36, 37 may be eliminated without deterioration of the quality expected for practical use.

What is claimed is:

1. Push-pull inverter comprising a boosting transformer having a first primary coil, a first secondary coil, a second primary coil and a second secondary coil; first and second switching elements each having a control electrode adapted for controllably interrupting primary current flowing through said first and second primary coils; a capacitor connected between the respective control electrodes of said two switching elements; and a feedback circuit in which one end of said first secondary coil is connected to the control electrode of the first switching electrode and one end of said second secondary coil is connected to the control electrode of the second switching element so that load current from a load connected between the other ends of these first and second secondary coils flows through said capacitor.

2. Push-pull inverter as recited in claim 1, further comprising an auxiliary feedback circuit so arranged that the primary coil voltage generated as the current flowing through the first primary coil is interrupted by the first switching element is fed back to the control electrode of the second switching element and the primary coil voltage generated as the current flowing through the second primary coil is interrupted by the second switching element is fed back to the control electrode of the first switching element.

3. Push-pull inverter as recited in claim 1, wherein the boosting transformer further including an intermediate tap by means of which the first primary coil is connected to the second primary coil and wherein the first primary coil is in lap-wound relationship with the first secondary coil and the second primary coil is in lap-wound relationship with the second secondary coil.

4. Push-pull inverter as recited in claim 1, further comprising a capacitor for resonance circuit connected in parallel to the first and second primary coils.

5. Push-pull inverter as recited in claim 1, wherein the boosting transformer includes an E-I-E-type ferrite core so that the first primary and secondary coils cooperate with E-shaped core and I-shaped core provided on one side to form a part of the transformer while the second primary and secondary coils cooperate with E-shaped core and I-shaped core provided on the other side to form the rest part of the transformer.

* * * * *